(12) United States Patent
Avazpour et al.

(10) Patent No.: US 11,558,242 B2
(45) Date of Patent: *Jan. 17, 2023

(54) GENERATION OF SYNTHETIC ALERTS AND UNIFIED DASHBOARD FOR VIEWING MULTIPLE LAYERS OF DATA CENTER SIMULTANEOUSLY

(71) Applicant: CERNER INNOVATION, INC., Kansas City, KS (US)

(72) Inventors: Jim Avazpour, Overland Park, KS (US); Pavan Kumar R P, Bengaluru (IN); Kotresh Kori, Bengaluru (IN); D. Sasidhar Reddy, Bangalore (IN); Doug Saus, Platte City, MO (US); Volodymyr Polishchuk, Kansas City, MO (US)

(73) Assignee: CERNER INNOVATION, INC., North Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,550

(22) Filed: Oct. 22, 2021

(65) Prior Publication Data
US 2022/0086039 A1 Mar. 17, 2022

Related U.S. Application Data

(63) Continuation of application No. 17/018,077, filed on Sep. 11, 2020, now Pat. No. 11,201,779.

(51) Int. Cl.
*H04L 41/0686* (2022.01)
*H04L 41/0681* (2022.01)
(Continued)

(52) U.S. Cl.
CPC ......... *H04L 41/0686* (2013.01); *G06N 20/00* (2019.01); *H04L 41/0681* (2013.01);
(Continued)

(58) Field of Classification Search
CPC . H04L 41/0686; H04L 41/0681; G06N 20/00; H04N 1/00129
See application file for complete search history.

(56) References Cited

U.S. PATENT DOCUMENTS 8,041,799 B1 * 10/2011 Usery ................. H04Q 3/0075
714/48
11,201,779 B1 12/2021 Avazpour et al.
(Continued)

FOREIGN PATENT DOCUMENTS

EP 2801879 B1 9/2017
WO 2019/241199 A1 12/2019

*Primary Examiner* — Austin J Moreau
*Assistant Examiner* — Chhian (Amy) Ling
(74) *Attorney, Agent, or Firm* — Shook, Hardy & Bacon L.L.P.

(57) ABSTRACT

Systems and methods provide for automatically generating a data model that includes a first data feed conforming to industry standards where only alerts for alert triggering violations are provided. The data model further comprises a second data feed that includes both the alerts from the first data feed and a plurality of synthetic alerts for any violations that occur in a data center but do not qualify as alert triggering violations. This second data feed provides a complete picture of the performance of a data center's devices and allows for accurate analytics.

20 Claims, 6 Drawing Sheets

Incoming Data Feed:

Console Alert Pattern:

Desired Alert Pattern:

(51) Int. Cl.
*G06N 20/00* (2019.01)
*H04N 1/00* (2006.01)

(52) U.S. Cl.
CPC ............... *H04N 1/00129* (2013.01); *G05B 2219/31439* (2013.01); *G05B 2219/36529* (2013.01)

(56) References Cited

U.S. PATENT DOCUMENTS

| | | | |
|---|---|---|---|
| 11,328,574 B2 * | 5/2022 | Zhang | G08B 21/182 |
| 2018/0052945 A1 | 2/2018 | Avazpour et al. | |
| 2018/0293516 A1 | 10/2018 | Lavid Ben Lulu et al. | |
| 2020/0124437 A1 | 4/2020 | Miyake et al. | |
| 2021/0027004 A1 | 1/2021 | Shirahata et al. | |

* cited by examiner

GENERATION OF SYNTHETIC ALERTS AND UNIFIED DASHBOARD FOR VIEWING MULTIPLE LAYERS OF DATA CENTER SIMULTANEOUSLY

CROSS REFERENCE TO RELATED APPLICATIONS

This application is a continuation of U.S. Pat. No. 11,201,779, filed on Sep. 11, 2020 and entitled "Generation of Synthetic Alerts and Unified Dashboard for Viewing Multiple Layers of Data Center Simultaneously", the entirety of which is incorporated by reference herein.

BACKGROUND

Large-scale networked systems are commonplace systems employed in a variety of settings for running service applications and maintaining data for business and operational functions. For instance, a data center within a networked system may support operation of a variety of service applications (e.g., web applications, email services, search engine services, etc.). A data center could include thousands of devices, including a complex hierarchy of switches. Each switch could have hundreds of ports and each port could be connected to multiple servers that could each, in turn, be running numerous virtual machines. In multi-tenant data centers, various tenants (i.e., customers employing the data center to run their applications) are dynamically assigned to devices and/or virtual machines running in the data center.

Due to the size of these large-scale network systems, vast amounts of data are created. Ingesting that volume of data is currently a challenge. By way of example, upwards of 5B events per day can be collected due to various devices and hundreds of thousands of endpoints in a data center being monitored (e.g., device health monitoring). Some data centers can have, for example, 450,000 network ports in different layers of the data base from the first layer close to the servers, to layers in between, and further to the top of the data center and the traffic leaving the data center to be communicated to the tenant/client.

SUMMARY

Embodiments of the present invention relate to, among other things, automatically generating a dashboard output of a data center monitoring status to facilitate management of the data center with an accurate picture of all events occurring within the data center. In accordance with the technology described herein, a tool is provided that configures a single view of device health data across all layers of infrastructure. The current solution is built on top of an infrastructure layer and leverages a software stack to index and analyze events to identify violations that need immediate attention versus those that still require attention but do not rise to the level of an alert triggering violation.

Accordingly, in one aspect, an embodiment of the present invention is directed to one or more computer storage media storing computer-useable instructions that, when executed by a computing device, cause the computing device to perform operations. The operations include receiving a raw data feed from a plurality of infrastructure layers, wherein the raw data feed comprises device data for one or more devices in each of the plurality of infrastructure layers for a plurality of time periods; applying a device violation rule set to the raw data feed to identify one or more violations in each of the plurality of infrastructure layers; identifying a first violation for a first device at a first time; identifying a second violation for the first device at a second time after the first time; identifying a third violation for the first device at a third time after the first and second times; applying an alert trigger rule set to the one or more violations; based on the alert trigger rule set, identifying that the first and second violations are not alert triggering violations and the third violation is an alert triggering violation; generating a first data feed including only a first alert for the third violation; generating a second data feed including both the first alert for the third violation and a synthetic alert for each of the first and second violations; and providing a dashboard including the one or more violations in each of the plurality of infrastructure layers in a single view.

In another embodiment, an aspect is directed to a computer-implemented method for generating a data model mapping a data center. The method includes receiving a raw data feed from a plurality of infrastructure layers, wherein the raw data feed comprises device data for one or more devices in each of the plurality of infrastructure layers for a plurality of time periods; applying a device violation rule set to the raw data feed to identify one or more violations in each of the plurality of infrastructure layers; identifying a first violation for a first device at a first time; identifying a second violation for the first device at a second time after the first time; identifying a third violation for the first device at a third time after the first and second times; applying an alert trigger rule set to the one or more violations; based on the alert trigger rule set, identifying that the first and second violations are not alert triggering violations and the third violation is an alert triggering violation; generating a first data feed including only a first alert for the third violation; generating a second data feed including both the first alert for the third violation and a synthetic alert for each of the first and second violations; and providing a dashboard including the one or more violations in each of the plurality of infrastructure layers in a single view.

A further embodiment is directed to a computer system comprising one or more processors; and one or more computer storage media storing computer-useable instructions that, when used by the one or more processors, cause the one or more processors to: receive a raw data feed from a plurality of infrastructure layers, wherein the raw data feed comprises device data for one or more devices in each of the plurality of infrastructure layers for a plurality of time periods; apply a device violation rule set to the raw data feed to identify one or more violations in each of the plurality of infrastructure layers; identify a first violation for a first device at a first time; identify a second violation for the first device at a second time after the first time; identify a third violation for the first device at a third time after the first and second times; apply an alert trigger rule set to the one or more violations; based on the alert trigger rule set, identify that the first and second violations are not alert triggering violations and the third violation is an alert triggering violation; generate a first data feed including only a first alert for the third violation; generate a second data feed including both the first alert for the third violation and a synthetic alert for each of the first and second violations; and provide a dashboard including the one or more violations in each of the plurality of infrastructure layers in a single view.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
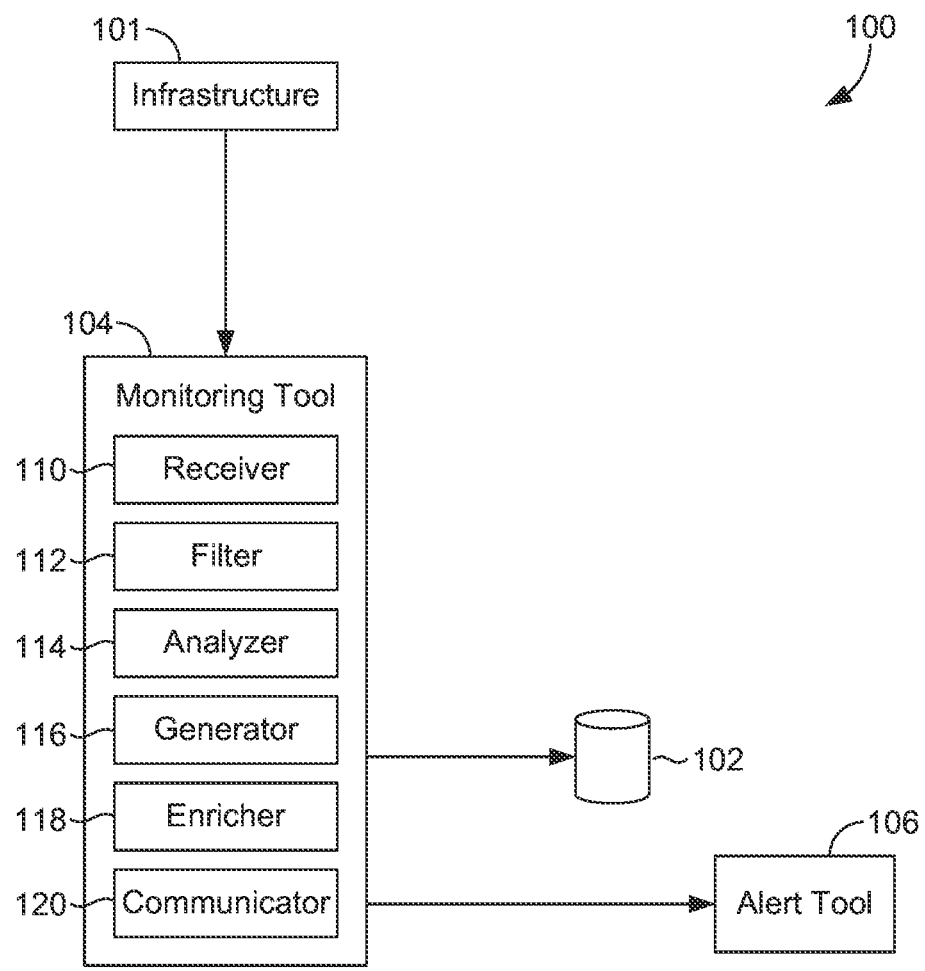
FIG. 1 is a block diagram illustrating an exemplary computing environment suitable for use in implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention address the technical challenge of generating a data model including separate feeds of data and incorporating that model with application data to quickly pinpoint an issue and the source thereof. The present solution, referred to herein as a monitoring tool, utilizes raw data from a data center to generate two separate data feeds, as described in further detail below. The first data feed can be utilized to identify alert triggering violations while the second data feed can be used to identify additional violations that do not trigger alerts but are necessary for an accurate picture of a data center's performance. The first data feed can conform to industry standards in that it only includes alerts for alert triggering violations. The second data feed goes against the industry standard by including the alerts for alert triggering violations and also generating synthetic alerts for each violation that is a not an alert triggering violation. The second data feed, in turn, creates more noise which creates a volume of data that is much harder for a system to parse through and requires exponentially more storage to facilitate. The present monitoring tool has intelligence to leverage the additional noise to identify patterns, anomalies, etc., in the second data feed to aid in the identification of issues that exist but, for various reasons, do not trigger an alert. These issues were previously undetected by current solutions since non-alert triggering violations are not identified in today's monitoring technology. These non-alert triggering violations are said to cause alert fatigue and are purposely eliminated from today's data. In order to utilize this data for predictive analytics, the present tool synthetically generates alerts to create a second data feed that is a complete view of a data center. Without these synthetic alerts providing insights into non-alert triggering violations, any analytics would be in accurate as they would be based on inaccurate data.

The data model includes not only information identifying devices within the data center but also the dependencies and relationships among the devices. In accordance with the technology described herein, inventory data is collected regarding devices in the data center. The inventory data includes information identifying the existence of devices within the data center and information describing the devices, such as identifying the type of each device (e.g., switch, server, storage, etc.). The inventory data can be obtained by querying devices, for instance, using the Internet Control Message Protocol (ICMP) and/or the Simple Network Management Protocol (SNMP), and/or by extracting the information from existing data sources used to manage the data center.

In addition to the inventory data, information regarding the dependencies and relationships of devices is collected. This includes switch-to-switch relationship data that provides information regarding the switching hierarchy within the data center. More particularly, switches in the data center are queried using a discovery protocol, such as the Cisco Discovery Protocol (CDP) or the Link Layer Discovery Protocol (LLDP), to obtain information identifying switches connected to ports on each switch. This provides information regarding the dependencies and relationships of switches within the data center. However, information regarding the dependencies and relationships of servers connected to switches is still needed. This can be considered the "last mile" of the data center. Accordingly, configurations described herein also obtain switch-to-server relationship data that identifies the linking relationship between switches and servers. More particularly, switches are interrogated to obtain MAC table data on the switches. The MAC table data on a switch is used to identify the MAC address of servers connected to the switch. Additionally, ARP data is obtained that provides information mapping IP addresses of servers to MAC addresses of the servers. Further, information mapping server hostnames to IP addresses is obtained, for instance, from DNS data or from the inventory data. As such, the IP address and hostnames of the servers connected to each switch is determined by matching the MAC table data from each switch to the ARP data and the information mapping hostnames to IP addresses. The inventory data, switch-to-switch relationship data, and switch-to-server relationship data is persisted to a data model.

As such, the data model provides a complete representation of the data center, including devices and their dependencies and any violations that occur therein due to the presence of synthetic alerts. The data collection process can be run automatically and on a regular basis to keep the data model updated as changes to devices and tenant assignments are made to the data center. Accordingly, the data model can be used for a variety of different data center management purposes by querying the data and/or generating views of the data in order to facilitate data center management activities. For instance, the data model can be used when troubleshooting to traverse paths within the data center to pinpoint malfunctioning devices. Additionally, the data model can be used to identify tenants affected by maintenance or update tasks within the data center.

With reference now to the drawings, FIG. 1 is a block diagram illustrating an exemplary computing environment 100 suitable for use in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes infrastructure 101, a monitoring tool 104, a database 102, and an alert tool 106.

Figure 2:
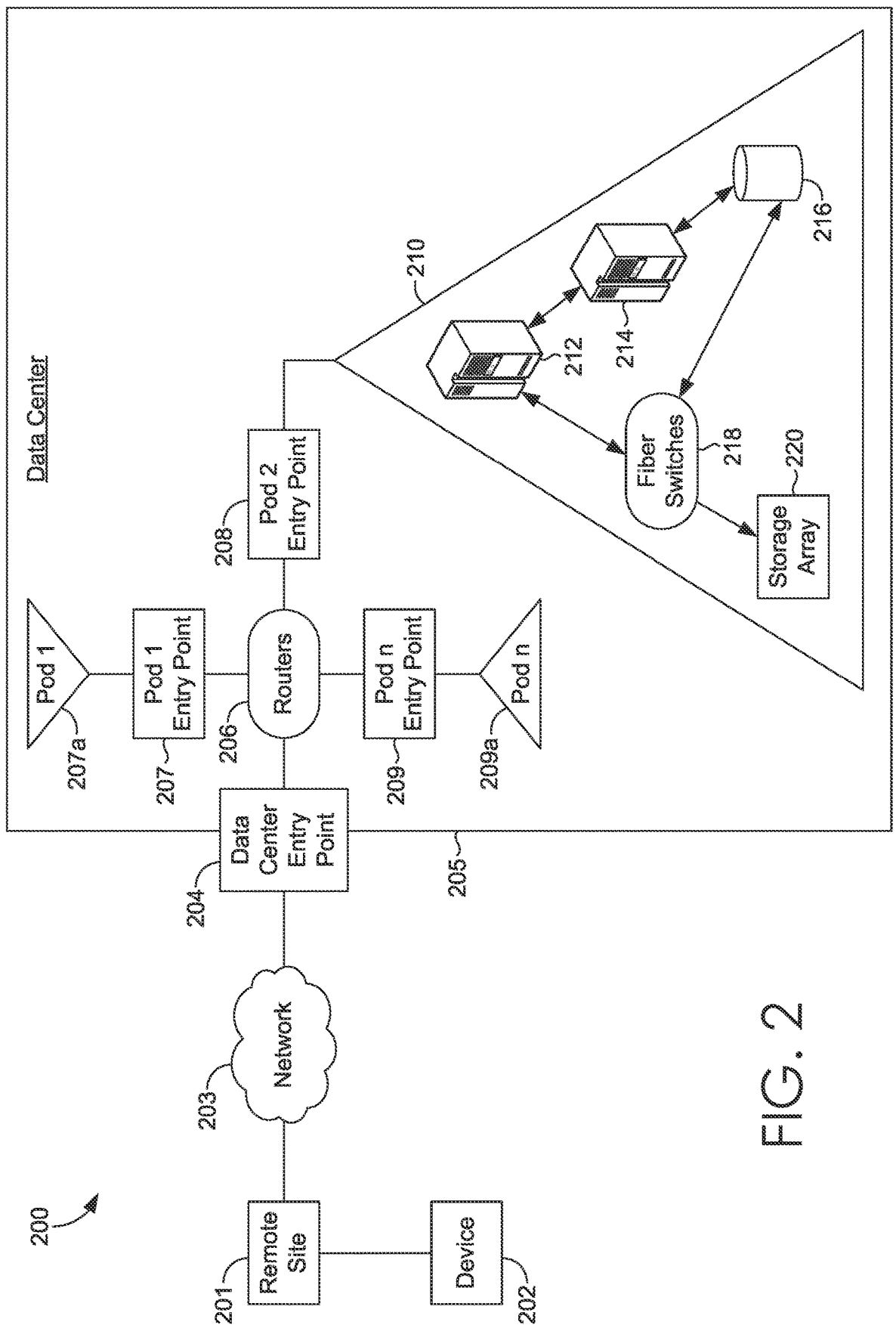
FIG. 2 is a block diagram illustrating an exemplary computing environment suitable for use in implementations of the present disclosure.

The infrastructure 101 represents a link to a data center with the monitoring tool 104. An exemplary data center environment 200 is illustrated in FIG. 2. As is shown, a remote site 201 (or tenant/client) has a plurality of devices, only shown by device 202 for clarity, which seek access to a data center 205 via a network 203. In embodiments, network 203 is a wide area network (WAN). Device 202 can be any device capable of use by a user. By way of example and not limitation, device 202 can be embodied as a personal computer (PC), a laptop computer, a mobile device, a smartphone, a tablet computer, a wearable computer, a personal digital assistant (PDA) device, a global positioning system (GPS) device, a video player, a handheld communications device, an embedded system controller, a camera, a remote control, a consumer electronic device, a workstation, or any combination of these devices or any other suitable computer device.

Each data center has a data center entry point 204 that data must pass through in order to enter the data center 205. Once through the data center entry point 204, the data is passed to router 206. Communication within the data center 205 can be facilitated via local area networks (LANs) with switches and routers. The router 206 determines a corresponding pod to which the data should be routed. In an example, each client is separated into separate pods. Client A may be in Pod 1 207a and access Pod 1 207a via Pod 1 entry point 207. Client B may utilize Pod n 209a and access Pod n 209a via Pod n entry point 209. Pod 1 207a and Pod n 209a can each be expanded in a fashion similar to Pod 2 210 but are not in FIG. 2 for simplicity. In the current example, device 202 is identified as associated with Pod 2 210 and accesses Pod 2 210 via Pod 2 entry point 208. Pods, as described herein, can be separated by physical firewalls and each client can be associated with a different pod. Thus, if there is an issue in one pod, it does not impact another pod (and, in turn, another client).

Upon entry to a pod, data can be sent to one or more servers such as servers 212 and 214 or database 216 to provide an application session to end users. While only two servers are shown in FIG. 2 for simplification purposes, it should be understood that any number of servers can be included in a data center. Each server and/or database can connect to backend switches such as switch 218 or storage arrays such as storage array 220 via a storage area network (not shown). Put another way, data centers generally include a number of devices for providing computing services. Among the devices can be a network of switches that provide for routing of data through the data center. The switches comprise a hierarchy that includes one or more core switches that provide a first switching layer for communications with outside computing devices employing the data center for computing services. Below the core switch (es) are layers of switches. It should be understood that any number of layers or switches may be employed in accordance with aspects herein. Any number of switches may be included at each layer of the data center, and more complex linking relationships than those shown in FIG. 2 may be employed.

Various information can be collected regarding the data center 205 and the data can be populated in a data model that provides a map of the data center 205, including information describing the devices in the data center and linking relationships among the devices.

Returning now to FIG. 1, the data center (shown as infrastructure 101) of FIG. 2 is linked to the monitoring tool 104. The information from the infrastructure 101, such as the device information and linking relationship information, can be sent to the monitoring tool 104. While shown as a separate component from the infrastructure 101, the monitoring tool 104 can be integrated within the data center 205.

The monitoring tool 104 can include a receiver 110, a filter 112, an analyzer 114, a generator 116, an enricher 118, and a communicator 120. The receiver 110 can receive or collect data for a data center, such as data center 205. As previously stated, the monitoring tool 104 can be integrated within the data center and utilize data collectors to collect data.

Data collectors can collect inventory data for the data center. The inventory data generally includes information identifying devices within the data center, including information regarding switches and server devices. The inventory data may not only identify the existence of devices within the data center but also provide information describing the devices, such as the type of each device and configuration information for each device. For instance, the inventory data can identify each device as a switch, a server, a storage device, or other type of device. Additionally, the inventory data can include network address information, such as IP addresses and MAC address of devices. The inventory data can further include information regarding tenants assigned to server devices. The inventory data can still further include information regarding vlans and virtual machines within the data center.

In some instances, inventory data can be obtained from devices by querying the devices using known protocols, such as ICMP and/or the SNMP. Additionally or alternatively, inventory data can be obtained by extracting the inventory data from various sources. For instance, inventory data can be extracted from an existing CMDB, PROTEUS IP address management platform, ALTIRIS endpoint management platform, HPNA, NETSCOUT data sources, VCENTER solutions, PRIMENETWORK management solution, ONCOMMAND INSIGHT management software, APIC controllers, and OPENSTACK controllers.

The data collectors operate to collect switch-to-switch relationship data, which provides information regarding linking relationships among switches in the data center (i.e., which switches are directly connected to one another). The switch-to-switch data is obtained by querying each switch to identify connected switches. The switches can be queried using a known discovery protocol, such as CDP or LLDP. The data collected for a given switch can identify which switch is connected to which port on the given switch. Based on data collected from the switches in the data center 205, a switching hierarchy may be generated to represent the switch-to-switch relationship data. The switch-to-switch relationship data is persisted to the data model in conjunction with the inventory data.

The data collector also operates to collect switch-to-server relationship data identifying which servers are connected to which switches in the data center 205. The switch-to-server relationship data is persisted to the data model in conjunction with the inventory data and the switch-to-switch relationship data. Thus, the data model can include any relationships identified within the data center 205 (e.g., switch-to-server relationships, switch-to-switch relationships, etc.), inventory data of each device within the data center 205, and the like. The creation of relationship information for the one or more devices within the data center 205 is further described in U.S. patent application Ser. No. 15/240,293, which is hereby incorporated by reference in its entirety.

The data collector also operates to collect health data from each of the one of more devices within the data center 205. Exemplary health data includes, but is not limited to, memory utilization, CPU utilization, device temperature, etc. The health data can be received, retrieved, and/or collected from, the one or more devices on a predetermined schedule or dynamically. For instance, a manual collection can be initiated by a user while the system can automatically collect the information at the expiration of a predetermined time period (e.g., every 5 minutes).

Once the data is received, it can be filtered out by the filter 112. The filter 112 operates to extract any data that does not include device health data from the collected data. Additional components can be present to analyze the extracted data, such as a relationship manager to perform the relationship linking capabilities described in U.S. patent application Ser. No. 15/240,293 referenced above. Other data, such an informational data, can be sent directly to the database 102 without any further analysis.

Once the collected data is filtered by the filter 112, analyzer 114 can analyze the device health data in the raw data feed collected to identify any violations. A violation, as used herein, is an event where health data of the one or more devices satisfies one or more criteria within a device violation rule set. A violation can satisfy criteria to be a violation but not satisfy criteria to trigger an alert. For instance, a violation for a device can be identified as having a temperature exceeding a predetermined threshold. However, an alert triggering violation related to temperature can require that the temperature exceed a predetermined threshold for a sequential predetermined number of times in a specific time interval (e.g., a violation occurs three times in a row in a fifteen minute period). Alert trigger rule sets are utilized and applied to the violations to identify when alert triggering violations are present. Alert triggering violations, as used herein, refer to violations that satisfy predetermined alerting criteria for a predetermined period of time and include a set a consecutive violations. These criteria exist in order to eliminate a high volume of alerts that are not critical. For example, a device having a high temperature above a predetermined threshold at a first time and then a normal temperature below the predetermined threshold at a second time is not an alert triggering violation since the issue has appeared to resolve itself and does not satisfy an exemplary alert criteria where a violation occurs three times in a row. This "noise" is eliminated in existing tools to reduce alert fatigue and only provide alerts for those violations that need immediate attention or, in other words, rise to the level of an alert according to alert trigger rule sets.

Figure 3:
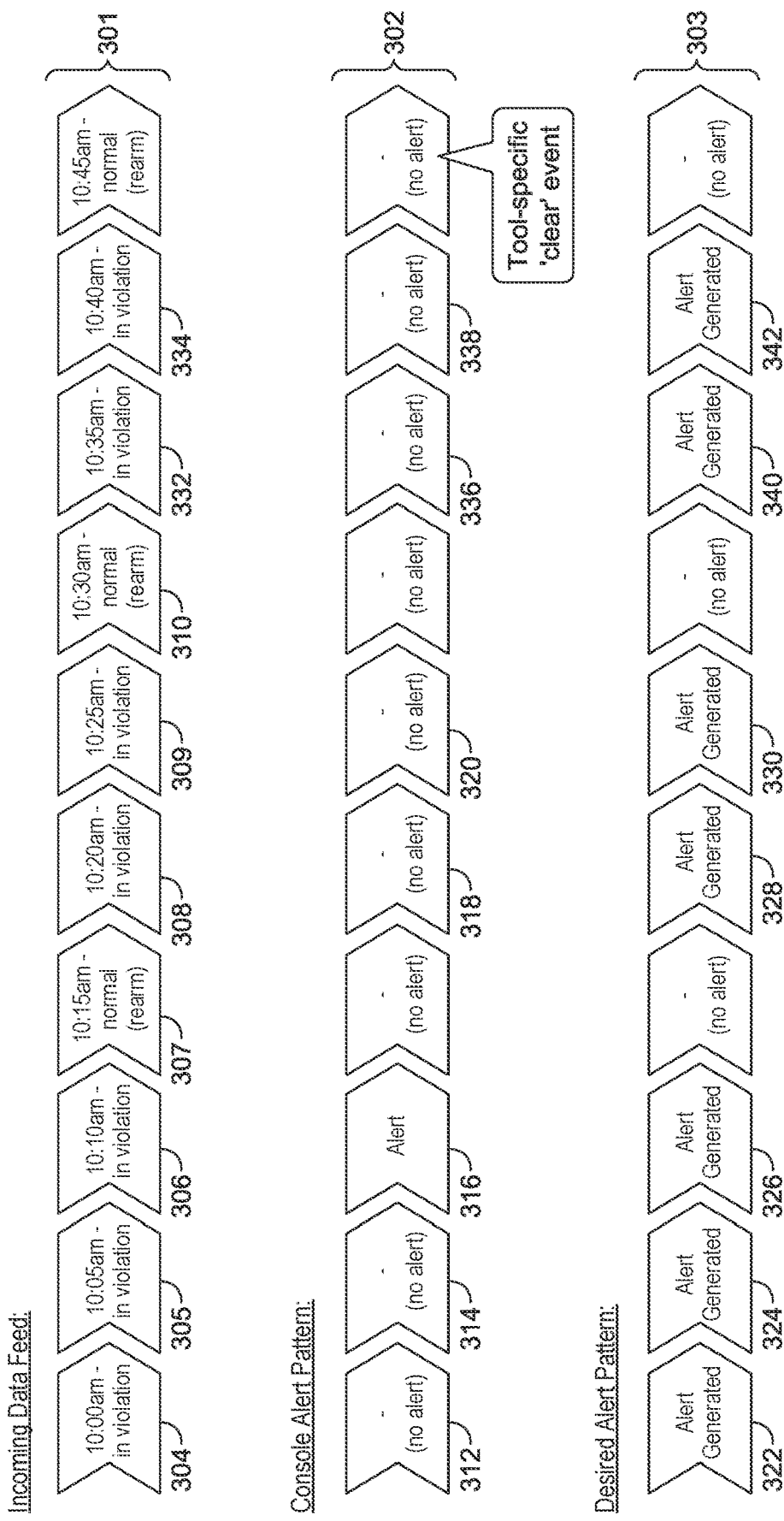
FIG. 3 is a diagram illustrating exemplary alert feeds, in accordance with aspects herein.

The present tool, however, does exactly the opposite of previous tools. The "noise", as it can be called, is essential in the present tool to proactively identifying problems before they are problems and to tracing problems back to a source. FIG. 3 provides an exemplary block diagram 300 illustrating the different methodologies for dealing with the incoming data. Incoming data feed 301 for a first device illustrates that a first device is in a violation state at block 304 identified at 10:00 am. This violation can be identified by application of a device violation rule set to the incoming data feed 301. The device violation rule set can identify whenever a threshold is met for a violation (e.g., a temperature threshold is exceeded). Another evaluation is performed five minutes later at 10:05 am and the first device is still identified to be in a violation state at block 305. Similarly, at block 306 the first device is still in a violation state at 10:10 am. However, at block 307 the first device is noted to be in a normal state. Blocks 304, 305, and 306 illustrate three consecutive violation states, which is needed to trigger an alert, which will be discussed momentarily. After the detection of an alert the monitoring tool is reset at block 307. After the reset, violation states are then identified at blocks 308 and 309 but not at block 310, falling short of the three consecutive violation states required to generate an alert and are reset at block 310 upon a normal status identification. Violation states are identified at blocks 332 and 334, again falling short of the three consecutive violation states required to generate an alert and are followed by a normal status. It should be noted that the monitoring periods illustrated in this example are depicted as every 5 minutes as that is an industry standard for certain device monitoring, but any time period for monitoring is configurable.

The industry standard is illustrated by a first data feed 302. As is shown, no alert is generated at blocks 312 and 314 that correspond to the violation states identified at blocks 304 and 305 since they are only two consecutive violation states. In embodiments, an alert is generated only when three consecutive violation states are identified. Once the violation state is identified at block 306 in feed 301, an alert is generated at block 316 since alert triggering rules are satisfied (i.e., three consecutive violation states are identified). Continuing on, a violation state was identified at blocks 308 and 309 in feed 301, but no alert is generated at corresponding blocks 318 and 320 since there were only two consecutive violation states detected in feed 301 before a normal state was identified at block 310. Similarly, no alert is generated at blocks 336 and 338 to correspond to violation states identified at blocks 332 and 334, as there were only two consecutive violation state readings. This illustrates the event where a device is in out and of violation and an alert is never triggered. There is no indication to an engineer from reviewing the first data feed 302 that the first device continued to be in a state of violation after generation of the alert. In other words, after the alert was generated at block 316, there were four other violation state readings for the first device (i.e., blocks 308, 309, 332, and 334) in feed 301 but no additional alerts were generated in the first data feed 302.

The monitoring tool 104 generates using, for example, generator 116, a second data feed 303 including any alerts that are generated in the first data feed 302 (i.e., the alert generated at block 316 due to alert triggering rules). The second data feed 303 also includes one or more synthetic alerts for any violations in the incoming data feed 301 that did not trigger an alert. In other words, a violation was identified (using the device violation rule set) but an alert was not triggered (using the alert trigger rule set). As is illustrated in the second data feed 303, synthetic alerts are generated, for instance, at blocks 328 and 330 to correspond to the violation states identified at blocks 308 and 309 in the incoming data feed 301 that did not trigger an alert in the first data feed 302. Additionally, while also not meeting the alert triggering rule set criteria, synthetic alerts are generated in the second data feed at blocks 322, 324, 340, and 342 to correspond with the violation states identified at blocks 304, 305, 332, and 334 of feed 301. Each of the first data feed 302 and the second data feed 303 are generated in real time as the incoming data feed 301 is received.

Each alert in the second data feed 303 is enriched, using enricher 118, with additional data associated with the event such as device information, server information, domain information, a data and time of the event, health data that triggered the violation, health data that triggered the alert (if any), and the like. In embodiments, violations of the first data feed 302 can also be enriched with additional data. All data is sent to a database 102 for storage using the communicator 120. Additionally, the first data feed 302 is communicated, by the communicator 120, to the alert tool 106 so that the necessary alerts are presented immediately (i.e., at or near real time). The second data feed 303 can be communicated for additional analysis to either a separate component (not shown) or by the analyzer 114 within the monitoring tool 114. The additional analysis of the second data feed 303 can identify patterns within the second data feed 303 or anomalies within the second data feed 303. To do this, the extra "noise" or alerts (i.e., the synthetic alerts) are needed by the monitoring tool 104 to perform the proper analysis. Current tools are merely providing alerts that satisfy alerting criteria and are not looking at additional violations that do not satisfy alerting criteria in order to pinpoint sources of problems. In fact, current tools cannot accept this data since it would trigger an alert at each violation instance and the tools are specifically built to ignore violation states that are non-alert triggering violations to avoid triggering alerts that do not satisfy the alerting criteria. Utilizing the first data feed provided by current tools would not be accurate for predictive analytics with the holes that are apparent in the first data feed (i.e., the number of violations that are never reported). The present tool overcomes this technological problem by creating the second data feed 303 including the synthetic alerts for each violation such that alerts are still triggered according to industry standards in the first data feed 302 but synthetic alerts are generated in the second data feed 303 to provide an accurate representation of the health of devices within a data center without over alerting through the solution. Because of the massive volume of these alerts (the synthetic alerts), the analytics cannot be handled by humans (another reason why current tools do not generate these alerts) and must be processed using machine learning tools provided by the monitoring tool 104.

Figure 4:
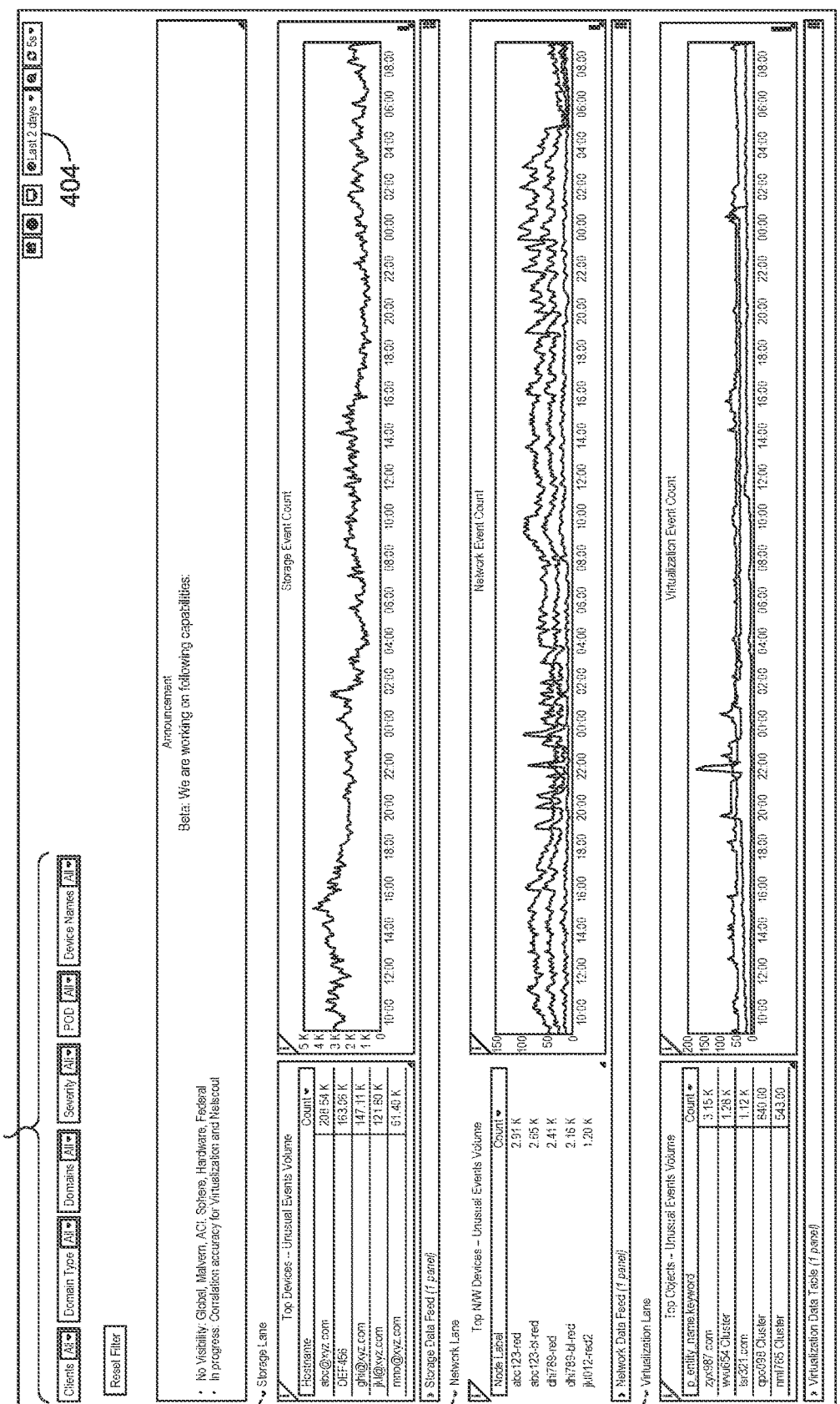
FIG. 4 is an exemplary interface illustrating a single view of alert feed data for a plurality of layers of infrastructure, in accordance with aspects herein.

Turning now to FIG. 4, an exemplary interface 400 is provided where the second data feed is displayed. The interface 400 includes several filtering options 402 such as the ability to filter by client, domain type, domains, severity, device names, and the like. The interface 400 also includes a time filter 404 where a data center's data can be shown over a specific period of time. Here, the exemplary time period is 2 days but can be any period of time desired (e.g., 30 days, 60 days, 2 hours, etc.).

Of particular note in interface 400 is the ability to provide a view into the second data feed for each of the plurality of layers of the data center. Each layer can be represented in a panel as shown by panel 406 illustrating the storage layer, panel 408 illustrating the network layer, and panel 410 illustrating the virtualization layer. While only three layers are shown here for clarity, many more are contemplated within the scope of this disclosure and one of skill in the art would recognize the additional layers of a data center that can be relevant to this view. As is shown, patterns in the second data feed can easily be identified by having visibility to the synthetic alerts generating in the second data feed. For instance, the panel 408 illustrated that all clients (as the client filter is currently set to "all" in the filter area 402) experience rises in violations (i.e., synthetic alerts) in similar time frames across the network layer.

Also possible using the interface 400 is the ability to provide multi-client events to find commonalities. For instance, there are times when multiple clients/tenants report issues. The interface 400 allows for selection of multiple clients and the overlaying of their data to identify issues. In one embodiment, all data from multiple clients is provided such that all violations (alerts and synthetic alerts) are provided for the selected clients. In other embodiments, commonalities can be selected for the multiple clients such that only devices that are shared between the clients and violations thereof are provided. This filtering is possible due to the data enrichment provided by the enricher 118.

Figure 5:
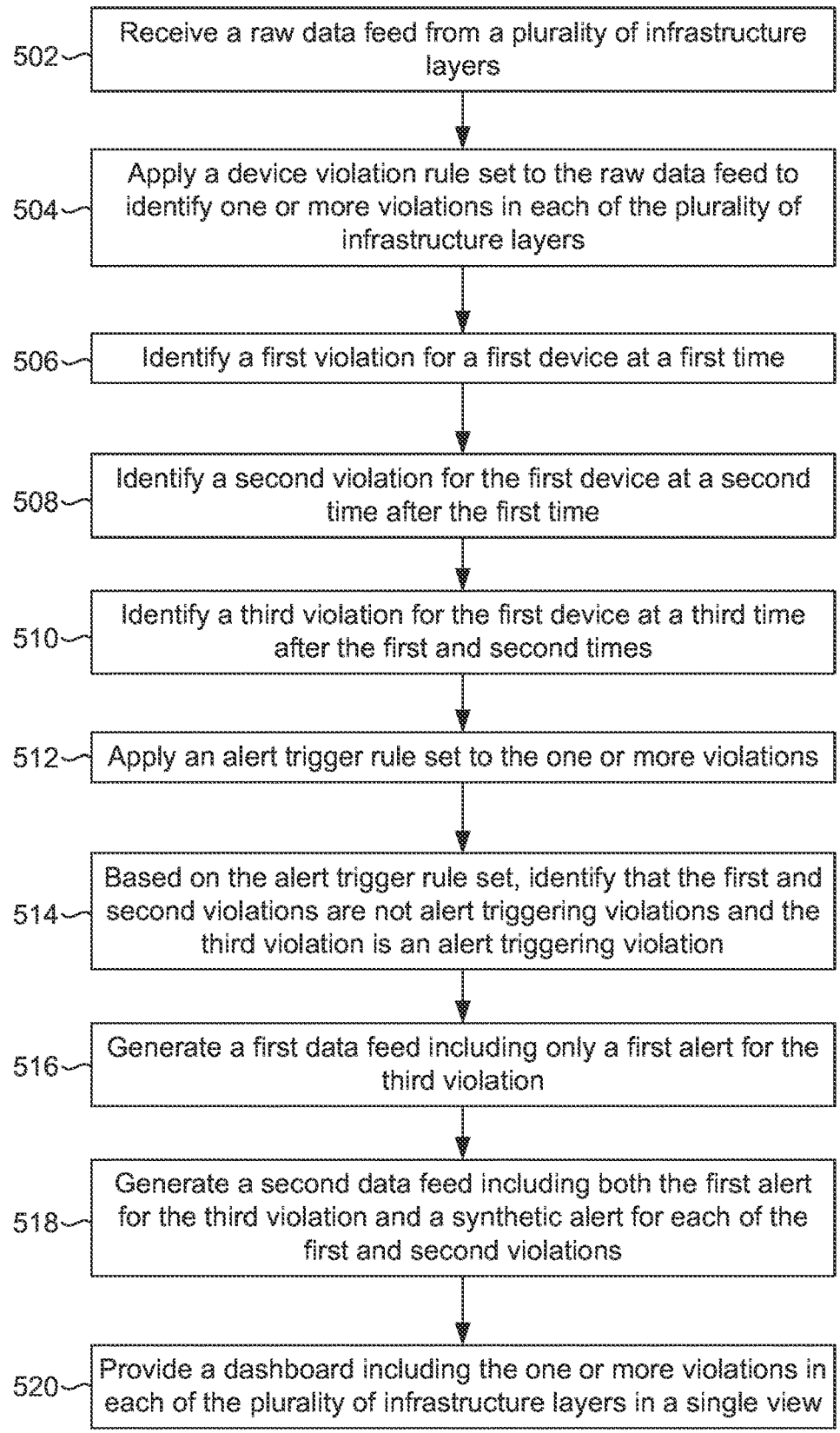
FIG. 5 is a flow diagram showing an exemplary method, in accordance with aspects herein.

With reference now to FIG. 5, a flow diagram is provided illustrating a method 500. Each block of the method 500 and any other method described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

The method 500 begins at block 502 where a raw data feed is received from a plurality of infrastructure layers (of a data center). The raw data feed comprises device data, such as health device data, for one or more devices in each of the layers for a plurality of time periods. A device violation rule set is applied to the raw data at block 504 to identify one or more violations in each of the plurality of infrastructure layers. A first violation for a first device is identified at block 506 for a first time. A second violation for the first device is identified at a second time after the first time at block 508. A third violation for the first device at a third time after the first and second times is identified at block 510. An alert trigger rule set is applied to the one or more violations at block 512. Based on the alert trigger rule set, it is identified, at block 514, that the first and second violations are not alert triggering violations and the third violation is an alert triggering violation. A first data feed including only a first alert for the third violation is generated at block 516. A second data feed including both the first alert for the third violation and a synthetic alert for each of the first and second violations is generated at block 518. A dashboard including the one or more violations in each of the plurality of infrastructure layers is provided in a single view at block 520. In particular, the second data feed is provided for each of the infrastructure layers.

Figure 6:
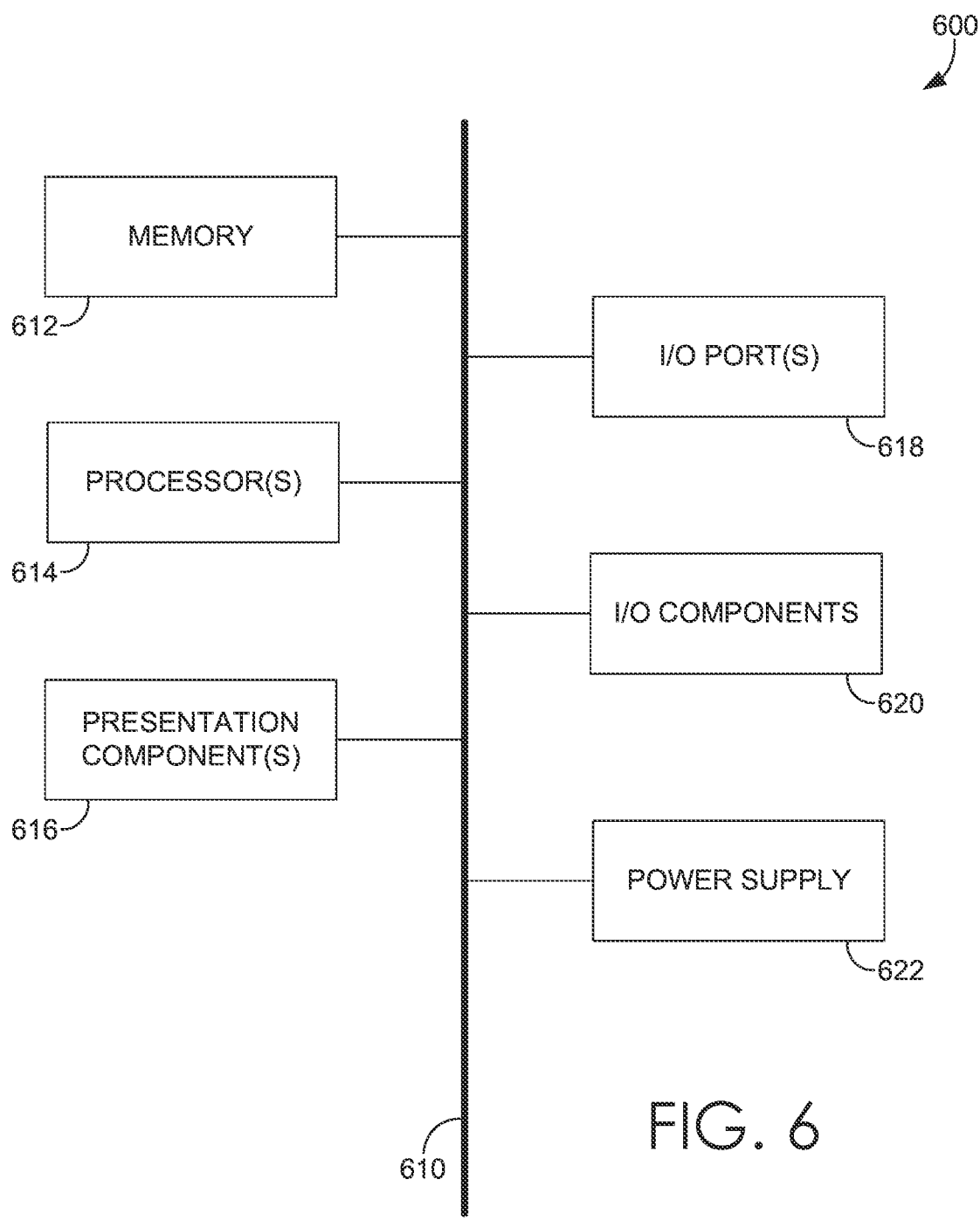
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600.

Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

As described above, implementations of the present disclosure relate to automatically generating a data model mapping devices and device connections within a data model. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for leveraging synthetic alerts, the method comprising:
   applying a device violation rule set to a raw data feed to identify a violation in one or more of a plurality of infrastructure layers;
   identifying a plurality of violations occurring over a period of time;
   applying an alert trigger rule to the plurality of violations;

generating a first data feed that includes an alert for at least one violation that does satisfy alert triggering criteria of the alert trigger rule in the plurality of violations;

generating a second data feed having the alert for the at least one violation that does satisfy the alert triggering criteria of the alert trigger rule and a synthetic alert for each violation of a subset of violations that do not satisfy the alert triggering criteria of the alert trigger rule in the plurality of violations; and providing a dashboard including the plurality of violations in each of the plurality of infrastructure layers in a continuous graphical user interface.

2. The method of claim 1, further comprising determining whether each violation of the plurality of violations satisfies the alert triggering criteria of the alert trigger rule or does not satisfy the alert triggering criteria of the alert trigger rule.

3. The method of claim 1, further comprising generating the synthetic alert for each violation of the subset of violations that does not satisfy the alert triggering criteria of the alert trigger rule in the plurality of violations.

4. The method of claim 1, wherein generating the second data feed comprises generating a distinct second data feed for each of the infrastructure layers, and wherein the dashboard includes the distinct second data feed generated for each of the infrastructure layers in the continuous graphical user interface.

5. The method of claim 1, wherein the second data feed includes greater data noise relative to the first data feed due the synthetic alert generated for each violation of the subset of violations that do not satisfy the alert triggering criteria of the alert trigger rule in the plurality of violations.

6. The method of claim 1, further comprising:
enriching the second data feed in real-time with device information for a plurality of devices;
identifying a pattern in the second data feed; and
tracing the subset of violations that do not satisfy the alert triggering criteria of the alert trigger rule to a particular device based on the pattern and the device information.

7. The method of claim 1, further comprising:
identifying a pattern in the second data feed;
determining a plurality of dependencies between a plurality of devices in the plurality of infrastructure layers; and
based on the pattern and the plurality of dependencies, identifying a particular device by traversing paths between the plurality of devices.

8. One or more computer storage media storing computer-useable instructions that, when executed by a computing device, cause the computing device to perform operations for leveraging synthetic alerts, the media comprising:
applying a device violation rule set to a raw data feed to identify a violation in one or more of a plurality of infrastructure layers;
identifying a plurality of violations occurring over a period of time;
applying an alert trigger rule to the plurality of violations;
generating a first data feed that includes an alert for at least one violation that does satisfy alert triggering criteria of the alert trigger rule in the plurality of violations;
generating a second data feed having the alert for the at least one violation that does satisfy the alert triggering criteria of the alert trigger rule and a synthetic alert for each violation of a subset of violations that do not satisfy the alert triggering criteria of the alert trigger rule in the plurality of violations; and
providing a dashboard including the plurality of violations in each of the plurality of infrastructure layers in a continuous graphical user interface.

9. The media of claim 8, further comprising determining whether each violation of the plurality of violations satisfies the alert triggering criteria of the alert trigger rule or does not satisfy the alert triggering criteria of the alert trigger rule.

10. The media of claim 8, further comprising generating the synthetic alert for each violation of the subset of violations that does not satisfy the alert triggering criteria of the alert trigger rule in the plurality of violations.

11. The media of claim 8, wherein generating the second data feed comprises generating a distinct second data feed for each of the infrastructure layers, and wherein the dashboard includes the distinct second data feed generated for each of the infrastructure layers in the continuous graphical user interface.

12. The media of claim 8, wherein the second data feed includes greater data noise relative to the first data feed due the synthetic alert generated for each violation of the subset of violations that do not satisfy the alert triggering criteria of the alert trigger rule in the plurality of violations.

13. The media of claim 8, further comprising:
enriching the second data feed in real-time with device information for a plurality of devices;
identifying a pattern in the second data feed; and
tracing the subset of violations that do not satisfy the alert triggering criteria of the alert trigger rule to a particular device based on the pattern and the device information.

14. The media of claim 8, further comprising:
identifying a pattern in the second data feed;
determining a plurality of dependencies between a plurality of devices in the plurality of infrastructure layers; and
based on the pattern and the plurality of dependencies, identifying a particular device by traversing paths between the plurality of devices.

15. A system comprising:
one or more processors configured to:
apply a device violation rule set to a raw data feed to identify a violation in one or more of a plurality of infrastructure layers;
identify a plurality of violations occurring over a period of time;
apply an alert trigger rule to the plurality of violations;
generate a first data feed that includes an alert for at least one violation that does satisfy alert triggering criteria of the alert trigger rule in the plurality of violations;
generate a second data feed having the alert for the at least one violation that does satisfy the alert triggering criteria of the alert trigger rule and a synthetic alert for each violation of a subset of violations that do not satisfy the alert triggering criteria of the alert trigger rule in the plurality of violations; and
provide a dashboard including the plurality of violations in each of the plurality of infrastructure layers in a continuous graphical user interface.

16. The system of claim 15, wherein the one or more processors are configured to determine whether each violation of the plurality of violations satisfies the alert triggering criteria of the alert trigger rule or does not satisfy the alert triggering criteria of the alert trigger rule.

17. The system of claim 15, wherein the one or more processors are configured to generate the synthetic alert for each violation of the subset of violations that does not satisfy the alert triggering criteria of the alert trigger rule in the plurality of violations.

18. The system of claim 15, wherein generating the second data feed comprises generating a distinct second data feed for each of the infrastructure layers, and wherein the dashboard includes the distinct second data feed generated for each of the infrastructure layers in the continuous graphical user interface.

19. The system of claim 15, wherein the second data feed includes greater data noise relative to the first data feed due the synthetic alert generated for each violation of the subset of violations that do not satisfy the alert triggering criteria of the alert trigger rule in the plurality of violations.

20. The system of claim 15, further comprising:
 enriching the second data feed in real-time with device information for a plurality of devices;
 identifying a pattern in the second data feed; and
 tracing the subset of violations that do not satisfy the alert triggering criteria of the alert trigger rule to a particular device based on the pattern and the device information.

\* \* \* \* \*